(12) United States Patent
Klötzer

(10) Patent No.: US 6,808,375 B2
(45) Date of Patent: Oct. 26, 2004

(54) EXPANDED POROUS THERMOPLASTIC POLYMER MEMBRANES AND DEVICE FOR THE PRODUCTION THEREOF

(75) Inventor: Rebecca Klötzer, Göttingen (DE)

(73) Assignee: Sartorius AG, Goettingen (DE)

( * ) Notice: Subject to any disclaimer, the term of this patent is extended or adjusted under 35 U.S.C. 154(b) by 180 days.

(21) Appl. No.: 10/058,443

(22) Filed: Jan. 22, 2002

(65) Prior Publication Data

US 2002/0091169 A1 Jul. 11, 2002

Related U.S. Application Data

(62) Division of application No. 09/642,390, filed on Aug. 18, 2000, now abandoned, which is a continuation of application No. PCT/EP99/00286, filed on Jan. 19, 1999.

(30) Foreign Application Priority Data

Jan. 29, 1998 (DE) .......................................... 198 03 362

(51) Int. Cl.$^7$ .............................................. B29C 44/46
(52) U.S. Cl. ....................... 425/4 C; 425/205; 425/207; 425/378.1; 425/817 C; 246/50; 366/105

(58) Field of Search ............................ 425/4 C, 817 C, 425/378.1, 205, 207, 208; 366/101, 105; 264/50, 51

(56) References Cited

U.S. PATENT DOCUMENTS

| | | | | | |
|---|---|---|---|---|---|
| 3,627,867 A | * | 12/1971 | Schwarz | ...................... | 264/211 |
| 3,957,651 A | * | 5/1976 | Kesting | ...................... | 210/490 |
| 4,039,691 A | * | 8/1977 | Hildebolt | ...................... | 426/511 |
| 4,164,603 A | * | 8/1979 | Siggel et al. | ................ | 428/398 |
| 4,476,077 A | * | 10/1984 | Bullard et al. | ................. | 264/53 |
| 4,613,471 A | * | 9/1986 | Harris | ........................ | 264/40.1 |
| 4,613,627 A | * | 9/1986 | Sherman et al. | ............... | 521/68 |
| 4,615,664 A | * | 10/1986 | Kolossow | ..................... | 425/4 C |
| 5,847,012 A | * | 12/1998 | Shalaby et al. | ................ | 521/61 |

FOREIGN PATENT DOCUMENTS

DE 19803362 A1 * 8/1999

* cited by examiner

Primary Examiner—Robert Davis
Assistant Examiner—Joseph S. Del Sole
(74) Attorney, Agent, or Firm—Chernoff, Vilhauer, McClung & Stenzel, LLP

(57) ABSTRACT

Open celled membranes from thermoplastic polymers are prepared from foamed polymer melts by extrusion through a die.

5 Claims, 1 Drawing Sheet

EXPANDED POROUS THERMOPLASTIC POLYMER MEMBRANES AND DEVICE FOR THE PRODUCTION THEREOF

"This application is a divisional of application Ser. No. 09/642,930 filed Aug. 18, 2000 now abandoned, which is a continuation of PCT/EP99/00286 filed Jan. 19, 1999."

BACKGROUND OF THE INVENTION

Foamed porous membranes are usable for the filtration of fluids in the micro- and macrofiltration range, in particular for prefiltration and final filtration of liquid media in industry, in the laboratory, and in the environmental protection sector.

As described in WO 97/06935, predominantly closed-cell polymer foams with cell sizes of less than 0.1 μm and cell densities of at least $1.56 \times 10^{14}$ cells/cm³ (supermicrocellular polymer foams), and with cell sizes of less than 100 μm and cell densities of more than $10^8$ cells/cm³ (microcellular polymer foams), can be manufactured by extrusion. The method is characterized by the steps of (a) forming a single-phase polymer/gas solution under pressure, (b) forming the nuclei for gas cells (cell nucleation) by pressure reduction, and (c) effecting cell growth. It is said to be essential to use a gear pump as a throttle valve between the extruder outlet and the nozzle, by which pressure reduction is controlled.

According to WO 92/17533, closed cell foamed films are produced from a foamable polymer and a supercritical fluid. Cell sizes of less than 1 μm and cell densities between $10^9$ and $10^{15}$ cells/cm are stated to be achieved. According to this very complex method, the film is produced by way of an extruder with a slit nozzle, a supercritical fluid such as $CO_2$ is introduced at room temperature to a pressure chamber through which the film is guided via rollers, nucleation takes place upon passage into a second chamber at standard pressure, and cell growth is achieved in the second chamber at a temperature >190° C. by feeding the film between heat exchangers and optionally by tempering. Alternatively, the supercritical fluid can also be introduced directly into the polymer melt inside the extruder, prior to extrusion by the nozzle.

WO 89/00918 describes the manufacture of closed-cell microcellular foams from semicrystalline polymers such as polypropylene and polyethylene with cell sizes varying from 1 to 100 μm. According to the method, the polymer, at elevated pressure and above its melting point, is saturated with gas, the polymer material is shaped by way of an extrusion nozzle or by injection-molding, the pressure is reduced for cell nucleation and foaming, and the temperature is then reduced to below the polymer's melting point in order to solidify the polymer foam. U.S. Pat. No. 4,473,665 discloses substantially the same method for the manufacture of closed-cell microcellular foams from amorphous polymers such as polystyrene, polyester, nylon, and polycarbonate, with cell sizes of approximately 2 to 25 μm and a pore volume of 5 to 30%.

Such closed-cell polymer foams are, however, unsuitable for filtration membranes since, due to their closed-cell nature they exhibit virtually no, or at best a very low, flow rate or flux for a medium to be filtered, and possess insufficient pore volume. In addition, defects due to uncontrolled cell growth cannot be ruled out. A further disadvantage is that the closed-cells of such foams would need to be converted, in a further process, into an open-celled material in order to obtain usable membrane materials.

EP 0 754 488 A1 describes a method for producing open-celled microfiltration membranes from such closed-cell polymer foams, but the method carries with it the risk of membrane rupture. According to this method, the webs of material between the cells of the closed-cell polymer foams are broken by compressing and stretching the polymer foam at various temperatures. The flat membranes of polypropylene described therein, having a thickness of between 2 and 200 μm, are said to have a wall thickness (B) to cell size (A) ratio of the polymer foam cells of less than 0.5, with a pore content not less than 50%.

WO 96/38221 discloses a method of making foamed polymer hollow fiber membranes. According to the method, a molten polymer is passed through an extrusion device, and the melt is charged with gas under pressure before entering a spinning nozzle which shapes the melt. The pressure drop upon emergence from the nozzle causes the polymer melt to foam, creating a porous hollow fiber membrane. The wall thickness of the hollow fiber is adjusted by stretching the hollow fiber membrane at an elevated temperature. The temperature of the melt in the extrusion device is regulated in such a way that for amorphous polymers it lies above the polymer's glass transition temperature, and for partially crystalline polymers it lies above the polymer's melting point. The size and shape of the pores are said to be adjustable by the extrusion parameters, such as pressure, temperature, extrusion screw shape and speed, as well as by the shape of the extrusion spinning nozzle. According to this method, foam structures having a pore size in the range from 10 to 20 μm and cell densities of approximately $10^{10}$ cells/cm³, can be achieved. These are predominantly closed-cell foams with a randomly scattered proportion of open cells of between 5 and 40%. The disadvantages of this method are that the hollow-fiber membranes produced have inadequate pore volume and flux for technical applications, and defects due to uncontrolled cell growth are possible.

Accordingly, the objects of the present invention are to create defect-free foamed membranes made of thermoplastic polymers that have a large void fraction and a high proportion of open cells with a narrow pore size distribution, to provide a continuous method for manufacturing such membranes as well as an apparatus for carrying out the method. These objects and others which will become apparent to one of ordinary skill are summarized and described in detail below.

BRIEF SUMMARY OF THE INVENTION

According to the present invention a polymer melt is formed comprising at least one amorphous and/or partially crystalline polymer, then delivered under pressure through an extrusion device, charged with a cell forming mixture and forced through a die to form a porous membrane. In response to the pressure drop occurring upon passage of the polymer melt through the die, the cell former foams the polymer melt, forming a predominantly open cellular structure in the polymer.

DETAILED DESCRIPTION OF PREFERRED EMBODIMENTS

Figure 1:
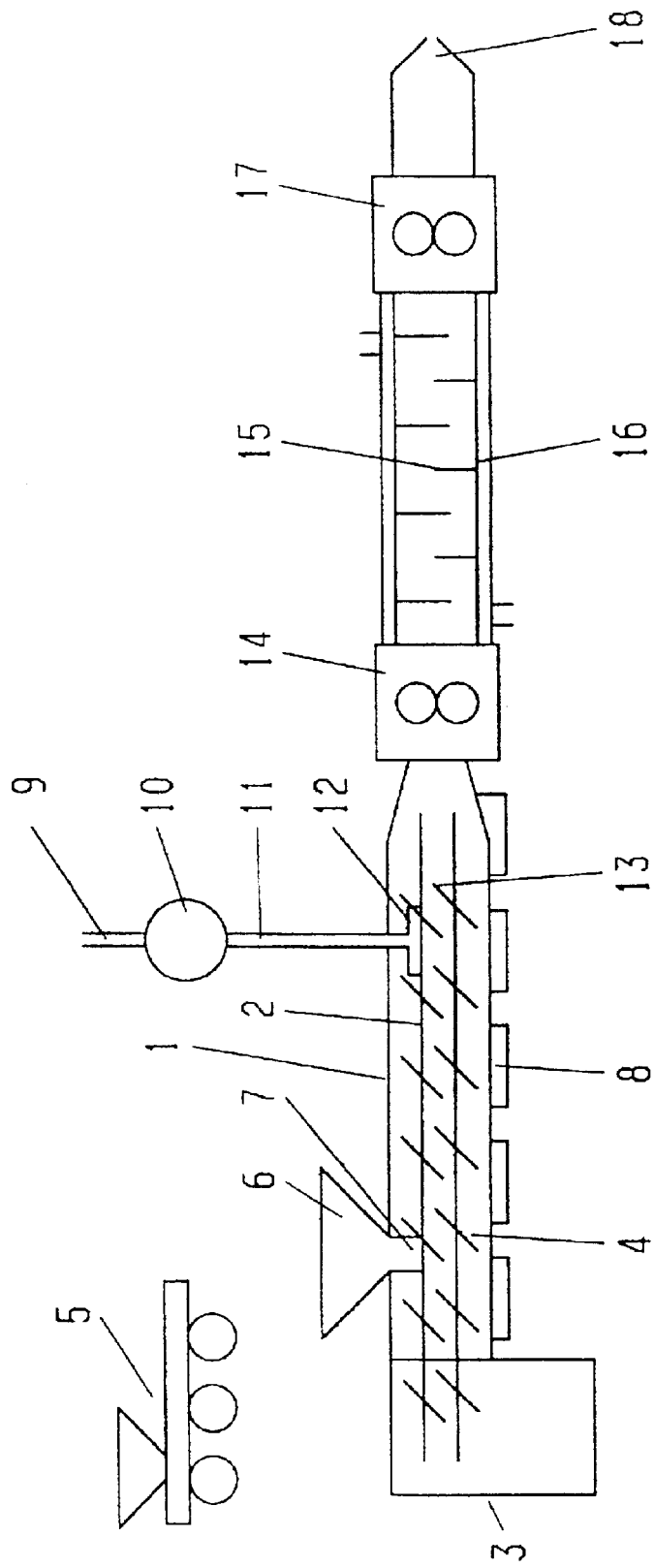
FIG. 1 is a schematic cross-sectional view of an exemplary apparatus according to the present invention.

Referring to FIG. 1, there is shown apparatus comprising an extruder 1 equipped with a synchronized twin screw 2 whose length-to-diameter ratio is, for example, 30, the twin screw 2 being rotationally driven in cylinder 4 by drive 3. The at least one polymer for the extrusion mass is preferably metered in pelleted form by metering apparatus 5, and passes via hopper 6 into feed opening 7 of extruder 1. Rotation of twin screw 2 causes the polymer pellets to be conveyed through cylinder 4. Heat is delivered to the polymer pellets by heating elements 8 that are separately adjustable to form a polymer melt. Injection stage 9 is located at a point that is approximately two thirds of the length of cylinder 4, the injection stage delivering a cell former and comprising a high-pressure precision metering pump 10 and a hollow needle 11 that preferably opens into cylinder 4 via sintered plate 12. The configuration and form of twin screw 2 are selected so that pressure builds inside cylinder 4. The pressure at the point at which the cell former is fed into the polymer melt through hollow needle 11 can be adjusted by way of the fill volume of the extrusion mass in cylinder 4 and the rotation speed of twin screw 2, and can be up to 200 bar.

After delivery of the cell former, in the last third of the length of cylinder 4, the extrusion mass passes into a first mixing zone 13 in which thorough mixing of the polymer melt is accomplished by twin screw 2 by way of conventional shear elements. Cylinder 4 is delimited, in the direction in which the extrusion mass flows out of the polymer melt, by a first melt pump 14. The first melt pump is connected to a heat exchanger 15 that may also serve as a second mixing stage so that the extrusion mass of the polymer melt is delivered by way of first melt pump 14 into heat exchanger 15 of the second mixing stage, this second mixing stage being equipped with a controllable heating and cooling system 16, which in turn is delimited by second melt pump 17. Melt pumps 14 and 17 are preferably gear pumps. During transport through heat exchanger 15 of the second mixing stage, a single phase polymer melt is produced, then cooled to a desired temperature below its initial softening temperature. (The glass transition temperature and melting point are referred to collectively herein as the "initial softening temperature," and the temperature at which proper operation of the extruder is assumed is referred to herein as the "initial processing temperature.")

By controlling melt pumps 14 and 17, the pressure of the polymer melt is adjusted to a desired value of up to 600 bar or more. Melt pump 17 delivers the polymer melt to die 18, which shapes the extrusion mass in the desired manner to form the membrane. As a result of the pressure drop that occurs upon emergence from die 18, the polymer melt is foamed to form the membrane. The parameters of pressure, temperature, polymer pellet feed rate, and screw and melt pump speeds may be controlled by a logic controller (not shown) so as to permit the apparatus to be operated automatically.

The pressure in the extruder is preferably at least 150 bar, and the temperature is set in the case of amorphous polymers and polymer blends to at least the glass transition temperature, and in the case of partially crystalline polymers and polymer blends to at least the melting point, in such a way that the viscosity of the polymer melt allows the extruder to operate properly.

In the second mixing stage located immediately before the die, a single-phase polymer melt is produced, comprising the at least one polymer and the cell former, the polymer melt being cooled to a temperature below its initial processing temperature and/or its pressure being elevated. Rather surprisingly it has been found that by producing a single-phase melt in the second mixing stage according to the present invention, it is possible to obtain membranes that have virtually no defects and that exhibit a high degree of homogeneity in terms of cell size.

Conventionally, the amount of cell former added is only that amount that can dissolve at the pressure and temperature in the polymer melt with no formation of gas bubbles, since an excess of cell former typically forms gas bubbles that become mixed into the melt without further dissolution in the melt. Upon foam nucleation in response to the subsequent pressure drop, the gas dissolved in the polymer diffuses into these already-existing gas bubbles and considerably enlarges them. In addition, no new gas bubbles, or only a few, form under these conditions. The reasons for this are thermodynamic, since energy must be expended for the creation of new surfaces, and diffusion into already-existing gas bubbles has a lower energy demand than the formation of new gas bubbles. All that is typically obtained according to conventional methods is a foamed polymer that has relatively few cells whose sizes fall within a fairly wide range of several hundred $\mu$m and which differ greatly in size from one another. Because of the average cell size and the great nonhomogeneity of the cell sizes, foamed polymers of this kind are unsuitable as filtration membranes.

But by either lowering the temperature of the polymer melt in the second mixing stage to a temperature below its initial processing temperature or by increasing its pressure therein, or both, it is possible to obtain foamed membranes that are characterized by a high void fraction of at least 75%. A void fraction of this magnitude is one of the economic prerequisites for use of the membranes in applications that require high fluxes.

At lower temperatures and higher pressures, a higher concentration of cell former can be introduced into the melt without causing undissolved gas bubbles—which, as described above, would cause negative effects—to remain in the polymer melt. This higher concentration of cell former results in the formation of a greater number of gas bubbles during cell nucleation. The lowering of the temperature of the polymer melt and/or elevation of the pressure in the second mixing stage makes it possible, in the injection stage, to inject more cell former into the polymer melt than can be dissolved in it under the temperature and pressure conditions prevailing there, since this excess of cell former is subsequently completely dissolved during processing in the second mixing stage. The use of a second mixing stage also ensures that no gas bubbles, in particular those resulting from the cell former, are present in the polymer melt. The process can thereby be controlled in terms of the cell former concentration in the polymer melt, thereby resulting in control of the void fraction and cell density of the membranes.

In general, the temperature of the polymer melt is also determined by the viscosity at which the extruder can still be operated economically and in a technically correct fashion. In the second mixing stage, however, the softening effect of the cell former dissolved in the melt is utilized. Because the initial softening temperature of the polymer decreases with increasing cell former concentration, in the second mixing stage it is possible, after the addition of cell formers such as $CO_2$, to lower the processing temperature by up to 100° C. and more as compared to the initial processing temperature without any rise in viscosity. In this context, the temperature is preferably lowered by at least 50° C.

The second mixing stage can be set up, for example, in the form of a cascade extruder or, in a preferred embodiment of the invention, can be located between the extruder and the membrane-forming die. The heat exchanger 15 may itself be used as the second mixing stage, being inserted between the two melt pumps, as a result of which the extrusion section is enlarged. In addition, because of the location of the two melt pumps at each end of the heat exchanger, a very high pressure level of 600 bar or more can be built up, independently of the pressure resulting from the internal extruder and the extruder screw torque. Heat exchanger 15 is equipped with cooling elements as well as heating elements in order to cool the extrusion mass of the single phase polymer melt. In a preferred embodiment of the invention, the second mixing stage is configured as a static mixer.

The pressure in the die, which may even be greater than that in the heat exchanger, depends on the flow resistance, and can be controlled via the flow velocity of the extrusion mass of the single phase polymer melt by its temperature and by the second melt pump preceding the die. The melt pumps before the inlet and outlet of the second mixing stage are preferably gear pumps. The pressure drop upon emergence from the die causes foaming of the polymer melt. The dies used to shape the membranes from the single phase melt are slit nozzles of the requisite membrane width for the manufacture of flat membranes, or hollow core nozzles for the manufacture of tubular membranes and hollow fiber membranes. In the case of the hollow core nozzles, a pressurized gas, for example compressed air, is advantageously used as the lumen-forming fluid.

Rather surprisingly it has been found that the foamed polymer membranes manufactured in accordance with the present invention exhibit a high proportion of open pores if the cell formers are substances that, under normal conditions, comprise at least two gases or at least two low-boiling-point liquids or a mixture of a gas and a low-boiling-point liquid wherein the gases or liquids or mixtures of gas and liquid have different diffusion rates with respect to the polymer melt. The cell formers should be inert with respect to the polymer(s) used in the extrusion mass. Carbon dioxide and water are most preferred as cell formers.

Although not wishing to be bound by any particular theory, it appears that cell opening takes place because the internal cell pressure exceeds the mechanical strength (governed by viscosity and surface tension) of the cell walls, resulting in rupture of the cell walls. The cell walls of the foam cells are obviously very thin in the foams that initially occur, since the present invention yields a high cell density and a high void fraction, and the main polymer mass is located in the webs of the cell structure. When a gas mixture made of at least two gases having different diffusion rates is used, the gas having the lower diffusion rate obviously results in a strong internal cell pressure that bursts the closed cells.

At processing temperatures above 100° C. (temperature of the charged extrusion mass of the single phase polymer melt), water is preferably used as one of at least two components of the cell former and is utilized to produce the pores by opening the cells. When a mixture of inert gas and water is used as the cell former, as the polymer melt emerges from the die and as the pressure drop simultaneously occurs, the resulting boiling of the water brings about an additional cell pressure that is sufficient to burst the closed cells.

The extrusion mass is preferably charged with liquified cell formers. For precise metering of the cell formers, the liquified cell formers are, for example, injected into the flowing polymer melt by way of precision liquid metering pumps. For example, when $CO_2$ is one of the at least two cell formers and when a backpressure valve is used after the pump, it is possible with the latter to compress the $CO_2$ from the gas cylinder to a pressure of 57 bar, liquefy it, meter it as a liquid, and inject it into the polymer melt during extrusion. In this context, the pump head must be thermostatically controlled to a constant temperature below 14° C., preferably −10° C., in order to maintain a constant density in the liquid $CO_2$ as a prerequisite for consistent liquid metering.

The cell formers can be introduced by way of a hollow needle through a sintered metal that preferably has pore sizes of approximately 20 $\mu$m and smaller, in order to obtain the largest possible contact surface at the phase boundary between the polymer melt and the liquid and/or gas.

Polymers useful in the invention include amorphous and partially crystalline polymers and mixtures thereof such as cellulose derivatives, polyolefins, polyesters, polysulfones, polyethersulfones, polyamides, and substituted versions of such polymers, such as poly(vinylidene fluoride). Polyesters, polysulfones, and polyethersulfones are particularly preferred.

Membranes in the micro- and macrofiltration range, having average pore diameters between 0.05 $\mu$m and 30 $\mu$m and between 10 $\mu$m and 200 $\mu$m, respectively can be obtained. The membranes have a pore volume of at least 75%, a proportion of open cells of at least 80%, and a pore size distribution with a standard deviation of ±10% of the average pore diameter.

Void fraction or pore volume (as a percentage) is calculated using the formula (1−crude density/polymer density)× 100. Crude density is defined as the foam mass per unit volume, and was determined by weighing the mass and calculating the volume from the linear dimension of a suitable specimen. Proportion of open cells (as a percentage) was measured using an air displacement pycnometer. With this method, a geometric volume of a specimen is compared to a reference volume at identical pressure in order to ascertain the air displaced by the foamed material, i.e., the volume corresponding to the closed cells plus the foam mass. The error resulting from cut cells at the surface was corrected by way of measurements on specimens with various surface-to-volume ratios. The proportion of open cells was determined by extrapolating the measured proportion of open cells to a surface-to-volume ratio of zero. Pore size distribution was determined from the profile of the air flow rate plots as a function of pressure at the wetted membrane whose pores were filled with water. Air flow rates were measured with a Coulter porosimeter.

The membranes may be supported or unsupported. For the manufacture of supported flat membranes the polymer membrane may be extruded directly onto a reinforcement material that is moved past the die or between two dies. In a further embodiment of the invention, supported membranes may be manufactured by one-sided or two-sided lamination. The reinforcement materials can bear a foamed membrane on one or two sides, or can reinforce a foamed membrane on one or two sides. Films, woven fabrics, knitted fabrics, or nonwoven fabrics made of metallic or polymeric materials are suitable as reinforcement materials; materials made of polymer fibers whose polymer belongs to the same polymer group as the membrane polymer are preferred. In a preferred embodiment of the invention, the polymer fibers are made of a first high-melting-point and high-strength core polymer whose surface is completely or partially covered by a second polymer. Membranes constructed in this fashion are particularly dimensionally stable. The second polymer has a lower melting point than the first core polymer, and is chemically resistant. Preferably it belongs to the same polymer group as the membrane polymer.

EXAMPLE

Foamed open-celled membranes were made using apparatus of substantially the same configuration as shown in FIG. 1. Polycarbonate pellets were delivered by metering apparatus 5 into extruder 1, which was heated to 245° C., with a twin screw 2 rotation speed of 30 rpm, and passed through the apparatus. As a result of the heat created during extrusion, the polycarbonate melt heated up to approximately 260° C. (initial processing temperature). The pressure profile in extruder 1 was selected by regulating the inlet rate through metering apparatus 5, the rotation speed of first gear pump 14, and the rotation speed of second gear pump 17, in such a way that a pressure of 150 bar was established at the point at which a cell former was injected through hollow needle 11, and a pressure of 400 bar was established inside the heat exchanger 15 of a second mixing stage.

At a constant feed rate of 20 g/min, the rotation speeds of gear pumps 14 and 17 were then set so as to result in a constant mass flow through extruder 1. As a result, the preset pressure level also remained constant. The cell former mixture of carbon dioxide and water was injected via high pressure precision metering pump 10 into the flowing extrusion mass of the polymer melt at a weight ratio of cell former to polymer of 9:1. The quantity of cell former injected per unit time corresponded to 15 wt % of the extrusion mass delivered per unit time.

Once injection of the cell former had begun, the temperature in heat exchanger 15 was reduced from the initial 245° C. extruder temperature. The temperature lowering was performed in increments of approximately 10° C. so as to maintain the viscosity of the extrusion mass approximately constant. As the temperature decreased, the quantity of dissolved cell former rose, and at the same time the polymer's glass transition temperature decreased due to the softening effect. This made it possible in turn to lower the processing temperature, which resulted in another rise in the quantity of dissolved gas.

In this fashion, the temperature of the extrusion mass was reduced from an initial 260° C. in the region of cylinder 4 located before gear pump 14 to approximately 150° C. in heat exchanger 15 of the second mixing zone. The polymer melt was then shaped, using a wide-slit die 18 at a die temperature of 220° C., into a flat film 40 cm wide, the polymer melt being foamed because of the pressure drop upon extrusion of the extrusion mass through the die.

The flat membrane manufactured in this fashion had a thickness of 0.4 mm, a cell or pore density of $10^{14}$ cells/cm$^3$ and an average cell size of 0.5 μm (±0.03 μm). Its void fraction or pore volume was 82%, 91% open cells. The water flux of the so-produced membrane was approximately 120 mL/(min/cm$^2$/bar), while its bubble point was approximately 1.9 bar.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. In an apparatus for making a foamed porous membrane comprising an extruder equipped with a metering apparatus and heating elements to form a polymer melt, said extruder having a cylinder connected via a first melt pump to a die for extrusion of a membrane from said polymer melt, an injection stage before said first melt pump for charging said polymer melt with a cell former, a heat exchanger located between said first melt pump and said die to form a second mixing stage, the improvement comprising a second melt pump located upstream from said die for forcing said polymer melt through said die.

2. The apparatus of claim 1 where said heat exchanger is equipped with a static mixer.

3. The apparatus of claim 1 wherein said injection stage comprises metering pumps that are connected via hollow needles and plates so as to be in fluid communication with said cylinder of said extruder.

4. The apparatus of claim 3 wherein said metering pumps are equipped with pump heads that are thermostatically controlled.

5. The apparatus of claim 1 wherein said die is configured as a wide-slit nozzle.

* * * * *